United States Patent [19]

Colell et al.

[11] 4,225,008
[45] Sep. 30, 1980

[54] THEFT-PROOF SYSTEM FOR MOTOR VEHICLES

[75] Inventors: Hans Colell, Schwieberdingen; Richard Hetmann, Tamm, both of Fed. Rep. of Germany

[73] Assignee: Dr. Ing. h.c.F. Porsche Aktiengesellschaft, Fed. Rep. of Germany

[21] Appl. No.: 874,150

[22] Filed: Feb. 1, 1978

[30] Foreign Application Priority Data

Feb. 3, 1977 [DE] Fed. Rep. of Germany ....... 2704478

[51] Int. Cl.² .............................................. B60R 25/00
[52] U.S. Cl. ...................................... 180/287; 70/237; 70/337; 200/44; 307/10 AT; 340/63
[58] Field of Search ................... 180/114; 70/340, 237, 70/238, 239, 337; 307/10 AT; 340/63; 200/44

[56] References Cited

U.S. PATENT DOCUMENTS

| 1,093,811 | 4/1914 | Voight ..................................... 70/340 |
| 3,555,859 | 1/1971 | Berkowitz ............................... 70/340 |
| 3,681,544 | 8/1972 | Etheridge ...................... 307/10 AT X |
| 3,708,032 | 1/1973 | Suzuki ..................................... 180/114 |
| 3,801,755 | 4/1974 | Schlage ..................................... 200/44 |
| 3,912,888 | 10/1975 | Takahashi ............................... 200/44 |
| 3,936,673 | 2/1976 | Kelly et al. ...................... 307/10 AT |

*Primary Examiner*—Robert R. Song
*Assistant Examiner*—Milton L. Smith
*Attorney, Agent, or Firm*—Craig & Antonelli

[57] ABSTRACT

A theft-prevention system for a motor vehicle wherein at least one cylinder lock having a closing cylinder and a switching mechanism that is relatively translatable with respect to the closing cylinder for actuating and deactuating the cylinder lock is engageable by a first key which is able to actuate and deactuate only the cylinder lock, and a second key which is engageable with the cylinder lock for actuating and deactuating both the closing cylinder and at least one auxiliary system for deterring the theft of the vehicle. Actuation of the auxiliary system by the second key engages a locking mechanism preventing operation of the cylinder lock.

18 Claims, 7 Drawing Figures

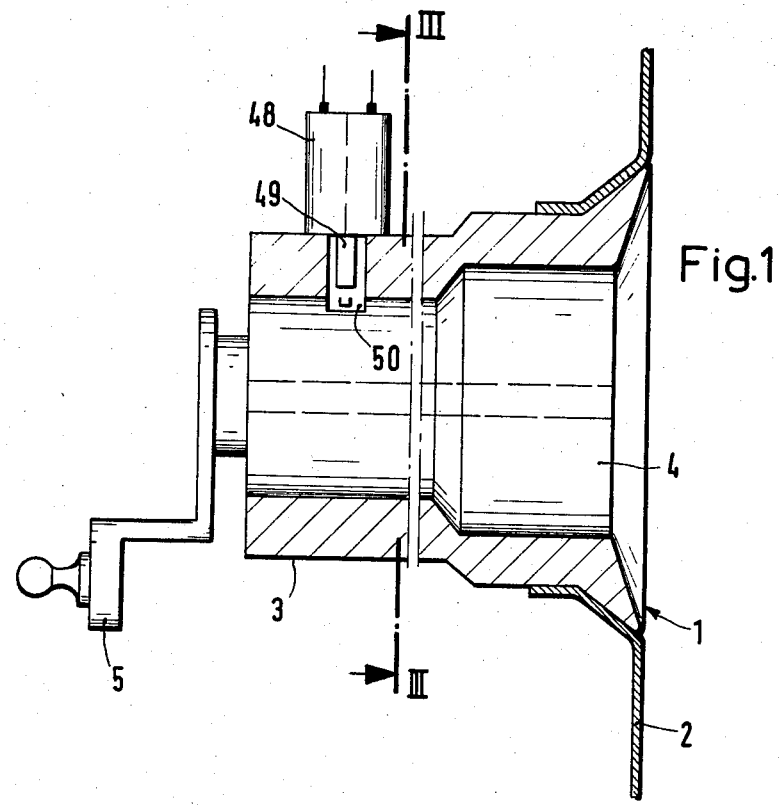
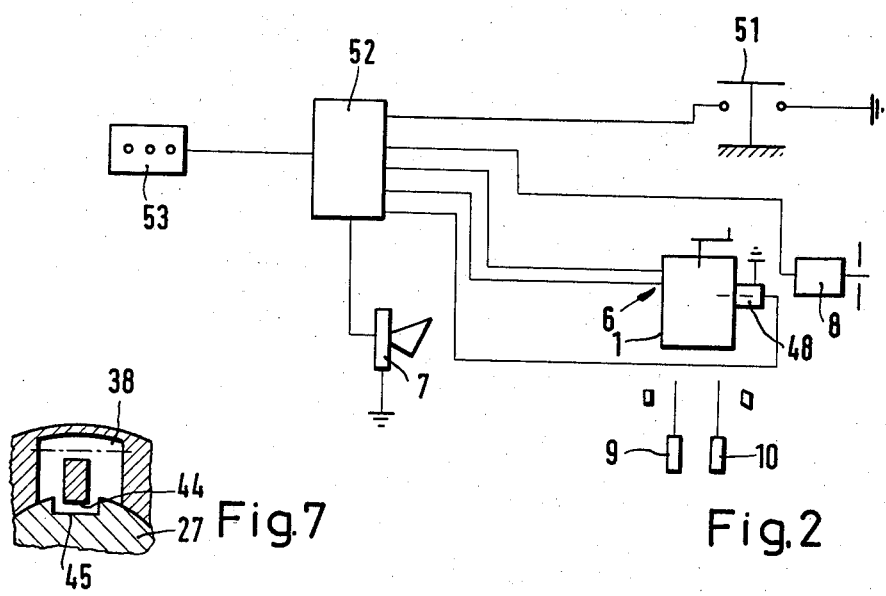

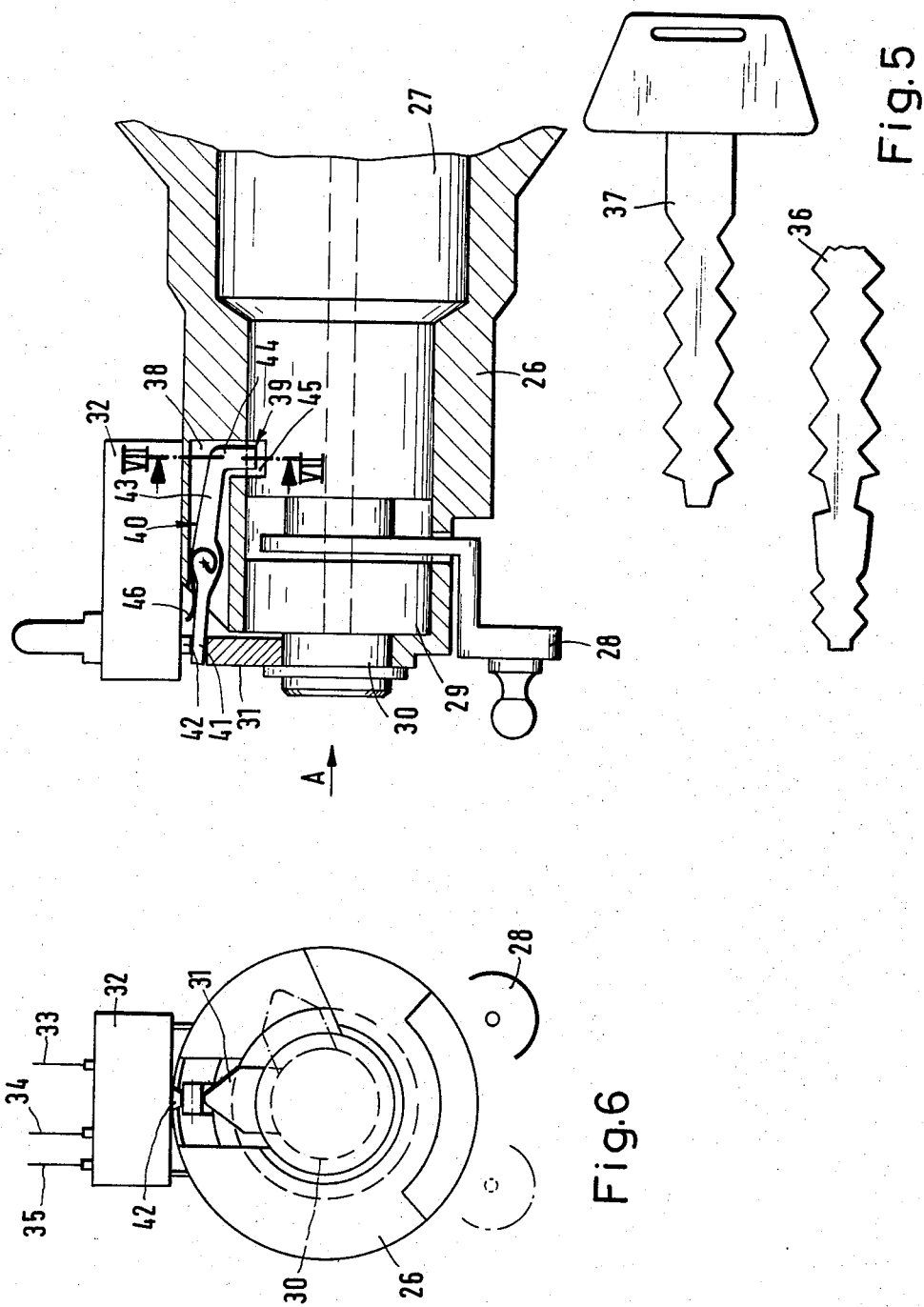

THEFT-PROOF SYSTEM FOR MOTOR VEHICLES

BACKGROUND AND SUMMARY OF THE INVENTION

The invention relates to a theft-proof (preventive) system for motor vehicles of the type having a cylinder lock for doors, hoods or the like, and including a closing cylinder.

Thefts of motor vehicles are made difficult by alarm and electromagnetic locking arrangements. If these are operated by a single key from, for example, the door lock, the danger exists that this key may be copied by an unauthorized person when the vehicle is in a repair shop, parking lot, or the like, so that the vehicle could be stolen at a later date without difficulty.

This invention has as an object the construction of a cylinder lock for a theft-proof (or theft-preventive) system for motor vehicles with respect to which the described disadvantages are avoided.

According to preferred embodiments of the invention, the above-noted problem is solved by an arrangement wherein at least one locking mechanism having a closing cylinder and a switching mechanism assembly relatively translatable with respect to the closing cylinder for activating and deactivating the locking mechanism is engageable by a first key which is able to activate and deactivate only the locking mechanism, and a second key which is able to activate and deactivate both the locking mechanism and at least one auxiliary device for deterring the theft of the vehicle.

In certain preferred embodiments the cylinder lock includes an electrical contact device for an electric alarm and/or locking or other auxiliary arrangement which is actuatable by way of a first, safety key in conjunction with the operation of the closing cylinder of the lock, while with a second, operating key, the closing cylinder only is operable. To this end, it is advantageous to have the contact device structurally combined with the lock. Both keys are preferably essentially of the same length, but with the safety key of a different cross-sectioned configuration than the operating key. In this manner, a row of tumblers, arranged in double-row, are brought in contact with a contact bridge operatively cooperating with the contact device by only one of the two keys.

According to other preferred embodiments, the safety key is longer than the operating key in which case it acts together with a cylinder section beyond the closing cylinder and separated therefrom to operate the control device. A supplemental locking mechanism for arresting the closing cylinder which can be operated only with the safety key is utilized in addition to or instead of an alarm according to other contemplated embodiments. This locking mechanism may be of either the mechanical or electromagnetic type.

The advantages obtained especially with the invention may be seen in that the possibility of the separate operation of the alarm and/or locking arrangement and closing cylinder with the safety key, on the one hand, and only the closing cylinder with the operating key on the other hand, makes it unnecessary for the vehicle owner to part with the safety key such that an unauthorized copying thereof is no longer possible because, when the vehicle is in a repair shop, parking lot, or the like, only the operating key need be left with the vehicle for its operation. Thus, since the contact arrangement can be operated only with the safety key which is constructed differently in relation to its cross-section or length, than the operating key, the locking mechanism according to the present invention assures that the lock closed with the safety key cannot be opened with the operating key. Additionally, by this means, an undesired starting of the alarm device, especially by an authorized user of the vehicle, is avoided.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 shows a longitudinal section through a preferred embodiment of the cylinder lock of the inventive theft-proof system;

FIG. 2 shows a schematic wiring diagram of the theft-proof system;

FIG. 5 shows a view according to FIG. 1 of a further exemplified embodiment;

FIG. 6 shows a view in the direction of arrow A of FIG. 5; and

FIG. 7 shows a cross-section along line VII—VII of FIG. 6.

DETAILED DESCRIPTION OF THE PREFERRED EMBODIMENTS

Figure 3:
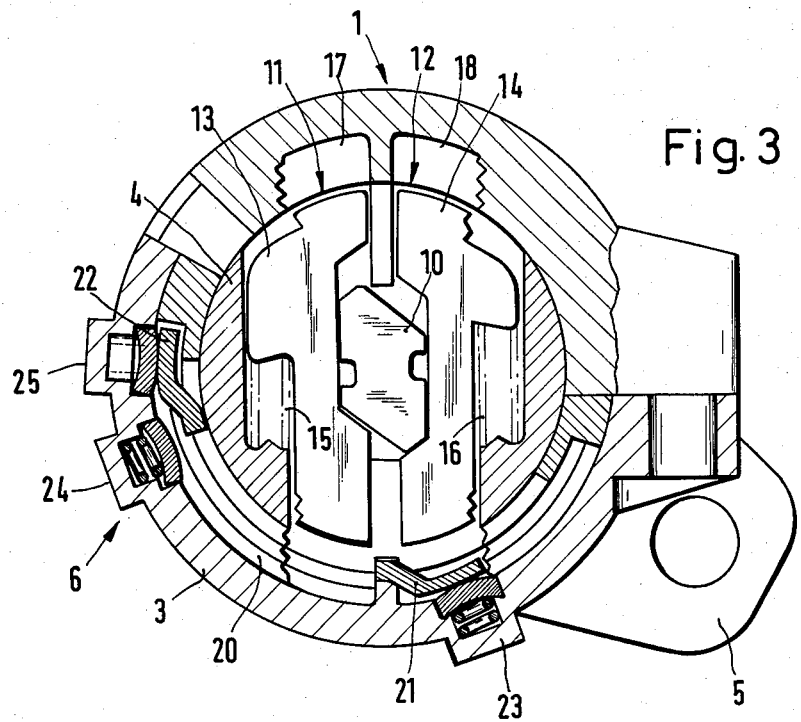
FIG. 3 shows a section according to line III—III of FIG. 1 in an enlarged scale, with an operating key inserted.

A cylinder lock 1 is mounted in the wall 2 of a door, hood or the like of a motor vehicle (not shown in detail) and comprises a housing 3 and a closing cylinder 4 arranged rotatably therein. A catch 5 is connected with the closing cylinder 4 which operatively cooperates with a locking mechanism, not shown in detail. Further, an electric contact device 6 is provided on the cylinder lock 1 by which the electric alarm and/or electromagnetic locking devices 7, 8 may be switched on or off (FIGS. 2, 3, and 4).

A safety key 9 serves for the common operation of the closing cylinder 4 and the contact device 6. On the other hand, with a further operating key 10, only the closing cylinder can be operated.

Figure 4:
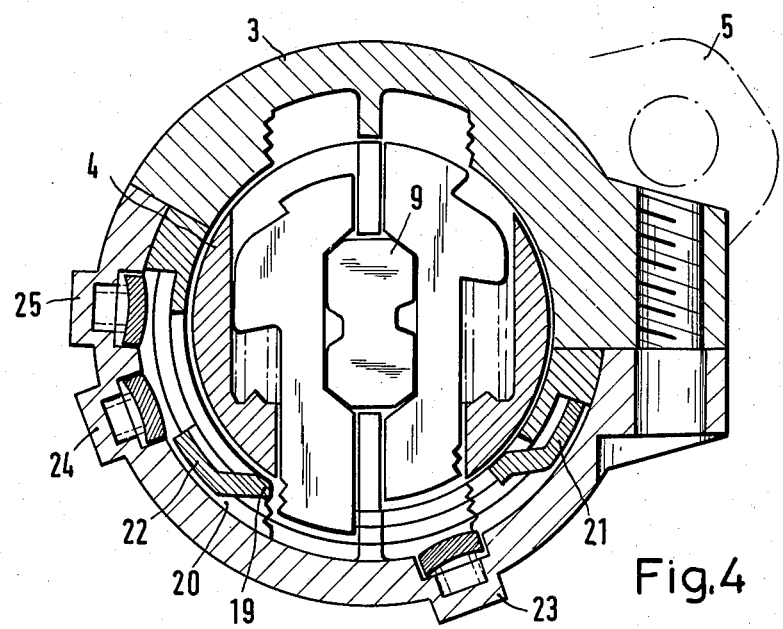
FIG. 4 shows a view according to FIG. 3, but with a safety key inserted.

According to FIG. 3, the contact device 6 is constructively combined with lock 1. Inside the closing cylinder 4, tumblers 13, 14 are arranged in double rows 11, 12 and are supported upon spring elements 15, 16 and engage into grooves 17, 18 of housing 3 when neither of the keys 9, 10 is inserted into the housing 3. If a safety key 9, corresponding to the length of the operating key 10, but having a different cross-section, is inserted, the tumblers 13 are moved out of the groove 17 by such a distance that they come to rest, during turning of the safety key 9, on a contact bridge 19. The contact bridge 19 forms a contact switching mechanism that is rotatably supported in a radial direction in a recess 20 of housing 3 of the cylinder lock 1. The contact bridge 19 is provided with contact plates 21, 22 whereof plate 21 operatively cooperates with a supply contact 23 from a source of current and plate 22 cooperates with contacts 24, 25 for the electromagnetic locking device 8 and/or the electric alarm device 7.

In FIG. 3, the contact bridge 19 is in the safety position, that is, the locking device 7 and the alarm device 8 are turned on. If now the operating key 10 is inserted and the closing cylinder 4 is turned into its opened position, the movement has no influence on the contact bridge.

In the exemplified embodiment according to FIG. 5, a closing cylinder 27 is arranged in the housing 26 which is provided with a catch 28 for the operation of the locking mechanism, for example, of the door. A cylinder section 29 is arranged beyond the closing cylinder 27. Cylinder section 29 is separate from the closing cylinder 27 and is also provided with tumblers, not shown. A pin 30 is solidly connected to the cylinder section 29. Also, an operating member 31 is connected fixedly to the pin. The operating member 31 forms a contact switching mechanism that cooperates with a contact device 32 which is arranged on the housing 26 and serves for switching the alarm and/or locking device on or off. For this purpose, current supply line 33 from a source of current and return lines 34, 35 to the alarm and/or locking arrangement are provided on the contact device 32. The safety key 36 serves for the operation of the closing cylinder 27 and the cylinder section 29, whereas only the closing cylinder 27 is operated with the operating key 37.

Further, a locking mechanism 39 is arranged in a niche 38 of housing 26. It comprises a double-armed lever 40, one lever arm 41 of which is arranged between the operating member 31 and contact 42 of the contact device 32. The other lever arm 43 is provided with a nose 44 which engages into a groove 45 of the closing cylinder 27. A spring element 46 seeks to turn the lever out of engagement with groove 45.

In place of this mechanical locking mechanism, a locking mechanism 47 of electromagnetic construction may be used (FIG. 1). In this case, an electromagnet 48 is fastened to housing 3 which, for locking of the closing cylinder, engages with a pin 49 into a groove 50 of the closing cylinder 4. Thus, since operating key 37 is of insufficient length to cause disengagement of the operating member 31, once the safety key has shifted it to the FIG. 6 position, the alarm and locking nose prevent unauthorized use of the vehicle by someone who has obtained a copy of an operating key for the vehicle.

The mode of operation of the theft-preventive system is as follows:

When the vehicle is, for example, in a garage for repair or maintenance, only the operating key 10 (or 37) is given to the maintenance personnel. With this operating key 10 (or 37) operation of the contact device 6 (or 32) is not possible. If, for example, the vehicle is parked on the street and it must be secured, the contact device 6 (or 32) and the closing cylinder 4 (or 27) are brought into their closing position by means of the safety key 9 (or 36). By this, the mechanical door locking is completed, the alarm device 7 is switched to ready and the electromagnetic door locking device 8 is closed.

If it is attempted to open the door with the operating key 10 (or 37), it will not be possible as a result of the locking mechanism 39 (or 48) which is also closed with the safety key 9 (or 36). If the door is forcefully opened, that is, under bypassing of the cylinder lock, the door contact switch 51 is closed and the alarm device 7 is sounded.

The locking mechanism 39 (or 48) assures that the authorized persons do not have the possibility to open the closing cylinder with the operating key alone which could result in a situation where the alarm device 7 could be started unintentionally.

The contact device 6 (or 32), the alarm device 7, the locking mechanism 8 and the door contact switch 51 are connected to a switchgear 52 which is connected to a source of current. The electromagnet 48 is also controlled by the switchgear 52.

Further, the possibility exists to accomplish switching the alarm device 7 on or off with the safety key 9 (or 36) from different parts of the vehicle. For this purpose, for example, the doors on both sides of the vehicle are provided with a lock 1 each of which is then connected to the switchgear 52. This has the advantage that when the door on the side of the driver is not accessible, for example, as a result of a vehicle standing in front of the door, the accessibility into the guest passenger compartment through the door next to the rear passenger is possible without sounding the alarm device.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A theft-prevention system for motor vehicles of the type having a lock on doors, hoods or the like of a vehicle, comprising:
    (a) at least one cylinder lock mechanism, said cylinder lock mechanism having a closing cylinder;
    (b) at least one auxiliary means for deterring theft of said vehicle including electrical contacts for actuating same;
    (c) a contact switching mechanism forming a further part of the cylinder lock mechanism, said contact switching mechanism being translatable relative to said closing cylinder;
    (d) first key means engageable with said cylinder lock mechanism for actuating and deactuating only said closing cylinder;
    (e) second key means engageable with said cylinder lock mechanism for actuating and deactuating both said closing cylinder and said auxiliary means; and
    (f) a locking mechanism engageable with said cylinder lock when auxiliary means is actuated for preventing operation of said cylinder lock by said first key means.

2. A theft-prevention system according to claim 1, wherein said auxiliary means is an alarm.

3. A theft-prevention system according to claim 1, wherein said auxiliary means includes a further lock mechanism.

4. A theft-prevention system according to claim 3, wherein said auxiliary means further includes an alarm.

5. A theft-prevention system according to claim 4, wherein said alarm is electric and said further lock mechanism is electromagnetic.

6. A theft-prevention system according to claim 4, wherein said first and second key means are essentially the same length, but are of different cross-sectional shape, wherein said contact switching mechanism is displaceable for activating an actuating means for said at least one auxiliary means, said contact switching mechanism being shiftable into a position for actuating said actuating means by peripheral surfaces of said second key means, but not said first key means.

7. A theft-prevention system according to claim 6, wherein said cylinder lock mechanism comprises a double row of tumblers positioned within a cylinder thereof for producing shifting of said contact switching mechanism and said actuating means comprises contacts on a contact bridge engageable with the electrical contacts of said auxiliary means.

8. A theft-prevention system according to claim 1, further comprising an electric contact device, said electric contact device being positioned relative to said closing cylinder and contact switching mechanism so as to enable opening and closing of said contact device by said second key means causing said relative translation between the closing cylinder and contact switching mechanism, but not by said first key means causing said relative translation.

9. A theft-prevention system according to claim 8, wherein said closing cylinder and contact switching mechanism are coaxially positioned with respect to each other and said relative translation is rotational.

10. A theft-prevention system according to claim 1, wherein said first and second key means are essentially the same length, but are of different cross-sectional shape, wherein said contact switching mechanisn is displaceable for activating an actuating means for said at least one auxiliary means, said contact switching mechanism being shiftable into a position for activating said actuating means by peripheral surfaces of said second key means, but not said first key means.

11. A theft-prevention system according to claim 10, wherein said cylinder lock mechanism comprises a double row of tumblers positioned within a cylinder thereof for producing said shifting of said contact switching mechanism and said actuating means comprises contacts provided on a contact bridge engageable with electrical contacts of said auxiliary means.

12. A theft-prevention device according to claims 10 or 1, wherein said system includes a plurality of said lock mechanisms and said auxiliary means may be actuated and deactuated by each of said locking mechanisms.

13. A theft-prevention system according to claim 1, wherein said second key means is longer than said first key means, wherein actuating means for said auxiliary means is located beyond said contact switching mechanism at a distance preventing operative engagement thereof by said first key means, but not said second key means.

14. A theft-prevention system according to claim 13 wherein said actuating means is a displaceable member, wherein said auxiliary means is an electric alarm, wherein a contact device is provided for actuating said alarm, and wherein said displacement of said displaceable member operates said contact device.

15. A theft-prevention device according to claim 14 wherein said locking mechanism is mechanically actuated by said actuating means.

16. A theft-prevention device according to claim 14, wherein said locking mechanism is electromagnetically operated by said actuating means.

17. A theft-prevention device according to claim 13, wherein said system includes a plurality of said lock mechanisms and said auxiliary means may be activated and deactivated by each of said locking mechanisms.

18. A theft-prevention device according to claim 1, wherein said system includes a plurality of said locking mechanisms and said auxiliary means may be actuated and deactuated by each of said locking mechanisms.

* * * * *